UNITED STATES PATENT OFFICE.

HENRY R. RANDALL, OF BROOKLYN, NEW YORK.

IMPROVEMENT IN PROCESSES OF MANUFACTURING MALT-EXTRACT.

Specification forming part of Letters Patent No. 187,313, dated February 13, 1877; reissue No. 7,688, dated May 15, 1877; application filed May 9, 1877.

*To all whom it may concern:*

Be it known that I, HENRY R. RANDALL, of the city of Brooklyn, in the county of Kings and State of New York, have invented an Improvement in the Manufacture of Malt-Sirup, of which the following is a specification:

Ordinarily, in the manufacture of malt-extract for brewing purposes, from ground corn, grain, or other suitable starch-bearing substance, the malt has been mingled with the starch-bearing substance at the outset of the operation. If this is done at that temperature at which the action of malt upon starch is most effective, the starch is not wholly liberated from the starch-bearing material, and, consequently, the yield of extract is deficient. If, on the other hand, the temperature is raised sufficiently high to insure the elimination of all the starch, the malt is itself injured; failing to act to the best advantage upon the starch, in like manner it diminishes the product of extract.

The object of this invention is to avoid the drawbacks just indicated, and to insure the elimination from the starch-bearing material of practically the entire quantity of starch contained therein, and then to insure the full effect upon such eliminated starch of all the malt brought in contact therewith, thereby insuring an increased yield of starch from the starch-bearing material, and the subsequent conversion of this eliminated starch into malt-extract by the most advantageous action of the malt.

To this end the invention consists in a novel process of manufacturing malt-extract from raw or unmalted grain or starch-bearing material for brewers' use, the same combining the successive steps of first reducing the grain or other starch-bearing material to a ground or comminuted condition; then eliminating the starch therefrom at a comparatively high temperature, substantially as described, and then subsequently subjecting such eliminated starch to the action of malt at a lower temperature, for converting it into dextrine and glucose or a malt-extract, so that the starch, being, by the first step aforesaid, completely eliminated from the refuse of the starch-bearing material, is exposed to the full action of the malt, thereby insuring the complete conversion of the starch into malt-extract.

In the practice of my invention, I take the corn, or other grain or starch-bearing material, and grind or comminute the same by any suitable means to a degree of fineness more or less approximating that of ordinary corn-meal, preferably somewhat finer than the latter. This I place in an ordinary mash-tub, or other suitable receptacle, and subject to a mashing operation at about a temperature of 180° Fahrenheit; but this temperature may be varied within certain limits, the object being to use that degree of warmth which will most readily cause the elimination of the starch from the refuse of the starch-bearing material during the operation aforesaid. It is to be understood that this ground corn, or other grain or starch-bearing material, is placed in the mash-tub, or equivalent receptacle, in a raw or unmalted condition, and that this first step in the process differs from the ordinary mashing process in this, that during such first step no malt whatever is mingled with the starch-bearing material, the object being simply to fully eliminate the starch from such material. This first step completed, malt is then added in suitable quantities, and, inasmuch as the starch has been practically wholly eliminated from the other portions or refuse of the starch-bearing material, it is exposed to the full action of the malt, and the operation may be conducted at that comparatively moderate temperature, say from about 150° to about 170°, or at that temperature at which the most effective action of the malt is secured. By these two successive steps, therefore, I first secure the total elimination of the starch from the starch-bearing material, and then secure practically the absolutely most advantageous action of the malt upon the starch, and thus, by securing the greatest possible amount of starch and the most effective action of the malt thereon, I produce a maximum quantity of extract from any given quantity of grain or starch-bearing material, thereby producing a decided and valuable improvement in the manufacture of beer, ale, or porter—in other words, of those liquids commonly termed "malt-liquor."

What I claim as my invention is—

The process of manufacturing malt-extract from raw or unmalted grain or starch-bearing material for brewers' use, the same combining the successive steps of first reducing the grain or other starch-bearing material by grinding to a comminuted condition, then eliminating the starch therefrom at a comparatively high temperature, substantially as described, and subsequently subjecting such eliminated starch to the action of malt at a lower temperature, for converting it into dextrine and glucose or a malt-extract.

HENRY R. RANDALL.

Witnesses:

EDWARD HOLLY,

H. WELLS, Jr.